US006877780B2

(12) United States Patent
Potts et al.

(10) Patent No.: US 6,877,780 B2
(45) Date of Patent: Apr. 12, 2005

(54) CLAMP FOR JOINING TUBULAR BODIES

(75) Inventors: Michael R. Potts, Troy, MI (US); Brian T. Ignaczak, Rochester, MI (US); Michael E. Amedure, Lake Orion, MI (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 0 days.

(21) Appl. No.: 10/185,169

(22) Filed: Jun. 27, 2002

(65) Prior Publication Data

US 2003/0015872 A1 Jan. 23, 2003

Related U.S. Application Data

(63) Continuation-in-part of application No. 09/886,793, filed on Jun. 21, 2001, now Pat. No. 6,758,501.

(60) Provisional application No. 60/302,220, filed on Jun. 29, 2001, and provisional application No. 60/213,791, filed on Jun. 23, 2000.

(51) Int. Cl.[7] .................................................. F16L 25/00

(52) U.S. Cl. ........................ 285/420; 285/367; 285/368; 285/373; 285/419

(58) Field of Search ................................. 285/420, 367, 285/368, 373, 419, 236, 337

(56) References Cited

U.S. PATENT DOCUMENTS

| | | | | | |
|---|---|---|---|---|---|
| 1,221,425 | A | | 4/1917 | Dremel | |
| 1,978,195 | A | | 10/1934 | Haas | |
| 2,189,350 | A | * | 2/1940 | Morris | 285/373 |
| 2,227,551 | A | * | 1/1941 | Morris | 285/373 |
| 2,426,423 | A | | 8/1947 | Woolsey | |
| 2,495,622 | A | * | 1/1950 | Arbogast | 285/289.1 |
| 2,731,280 | A | | 1/1956 | Goodliffe et al. | |
| 3,207,538 | A | | 9/1965 | Pattillo | |
| 3,782,763 | A | * | 1/1974 | Henrickson | 285/419 |
| 4,049,298 | A | * | 9/1977 | Foti | 285/148.26 |
| 4,261,600 | A | | 4/1981 | Cassel | |
| 4,312,526 | A | | 1/1982 | Cassel | |
| 4,360,227 | A | * | 11/1982 | Bridges | 285/373 |
| 4,364,588 | A | * | 12/1982 | Thompson | 285/419 |
| 4,380,348 | A | * | 4/1983 | Swartz | 285/236 |
| 4,409,873 | A | * | 10/1983 | Kundikoff | 83/745 |
| 4,463,975 | A | * | 8/1984 | McCord | 285/419 |
| 4,473,246 | A | | 9/1984 | McDowell, deceased | |
| 4,629,226 | A | | 12/1986 | Cassel et al. | |
| 4,664,428 | A | * | 5/1987 | Bridges | 285/373 |
| 4,813,720 | A | | 3/1989 | Cassel | |
| 5,007,666 | A | * | 4/1991 | Kyfes | 285/373 |
| 5,137,305 | A | * | 8/1992 | Straub | 285/112 |
| 5,362,107 | A | * | 11/1994 | Bridges | 285/15 |
| 5,383,496 | A | * | 1/1995 | Bridges et al. | 138/99 |
| 5,411,162 | A | | 5/1995 | Koziczkowski et al. | |
| 5,720,086 | A | | 2/1998 | Eliasson et al. | |

(Continued)

FOREIGN PATENT DOCUMENTS

DE 42 16 921 A1 9/1993

*Primary Examiner*—James M. Hewitt
(74) *Attorney, Agent, or Firm*—Reising, Ethington, Barnes, Kisselle, P.C.

(57) ABSTRACT

A band clamp used to connect tubular bodies such as vehicle exhaust system components. The band clamp has a band extending from a first end to a second end and includes a pair of spaced ribs extending at least part way between the first and second ends. A tightening mechanism is connected to the band and includes two clamp members movable toward and away from each other for tightening and loosening of the band. The band clamp further includes a gasket located on an inner surface of the band between the ribs and extending between the first and second ends. The use of the ribs with the interposed gasket provides a mechanical interlock of the band clamp with the tubular bodies while providing a hermetic seal at the junction between the two bodies.

30 Claims, 9 Drawing Sheets

U.S. PATENT DOCUMENTS

| | | | | | |
|---|---|---|---|---|---|
| 5,722,701 | A | | 3/1998 | Choi | |
| 5,905,231 | A | * | 5/1999 | Houte et al. | 174/68.3 |
| 5,944,365 | A | | 8/1999 | Kizler et al. | |
| 5,961,161 | A | * | 10/1999 | Sponer | 285/373 |
| 6,030,005 | A | | 2/2000 | Andersson et al. | |
| 6,062,610 | A | | 5/2000 | Andersson et al. | |
| 6,073,977 | A | | 6/2000 | Schmidt-Hansen et al. | |
| 6,089,624 | A | | 7/2000 | Cassel et al. | |
| 6,199,921 | B1 | | 3/2001 | Cassel et al. | |
| 6,269,524 | B1 | | 8/2001 | Cassel | |
| 6,398,267 | B1 | | 6/2002 | Detable et al. | |
| 6,431,216 | B1 | * | 8/2002 | Briscoe | 138/110 |
| 6,758,501 | B2 | * | 7/2004 | Amedure et al. | 285/373 |

* cited by examiner

CLAMP FOR JOINING TUBULAR BODIES

CROSS-REFERENCE TO RELATED APPLICATIONS

This application claims the priority of U.S. Provisional Patent Application No. 60/302,220, filed Jun. 29, 2001, and is a continuation-in-part of U.S. patent application Ser. No. 09/886,793, filed Jun. 21, 2001, now U.S. Pat. No. 6,758, 501, which itself claims priority of U.S. Provisional Patent Application No. 60/213,791, filed Jun. 23, 2000.

TECHNICAL FIELD

This invention relates to band clamps and more particularly it relates to band clamps for joining tubular bodies.

BACKGROUND OF THE INVENTION

There are many applications in industry which require the joining of two tubular bodies such as pipes, canisters and the like for containing fluid under pressure. Many of these applications require a joint which can be readily opened or disassembled for purposes of maintenance or repair. An example is that of vehicle engine exhaust systems wherein several different exhaust system components such as mufflers, catalytic converters, particulate filters and pipes are coupled together for discharging the exhaust gases to the atmosphere. In exhaust systems, the typical components are round or roundish in cross-section and the joints must provide a good fluid seal against exhaust gas leakage. Also, the joints must exhibit a high degree of mechanical strength for withstanding road shock and vibration without loosening and without impairment of the sealing properties of the joint.

In some applications, a joint must be provided between components which are substantially larger in girth than that of the pipes which are typically used between components such as mufflers and catalytic converters. This may involve either lap joints or butt joints, either of which may utilize circumferential ribs or beads to provide a positive mechanical engagement of the coupler with the components being joined. For configurations such as this where a rib or bead is used, various band clamp arrangements have been proposed. V-band clamps are well known, and different examples of these are shown in U.S. Pat. No. 2,731,280 to Goodliffe et al., U.S. Pat. No. 5,411,162 to Koziczkowski et al., and U.S. Pat. No. 6,073,977 to Schmidt-Hansen et al. As shown in the last of these, a rubber seal can be included that spans the two beads. Band straps having spaced circumferential ribs are also known for use in connecting sheet metal pipes. See U.S. Pat. No. 3,207,538 to Pattillo. The draw band disclosed therein comprises an open loop in which the ends overlap each other when the band is tightened. Such an arrangement results in a discontinuous step at the inner terminal end of the band and can be problematic for applications where a strong hermetic seal is needed such as in vehicle exhaust systems. This can be true even where a gasket is provided since the gasket is not subjected to uniform inwardly radial pressure at the inner terminal end of the band.

Therefore, it is a general objective of this invention to provide an improved band clamp which overcomes certain disadvantages of the prior art.

SUMMARY OF THE INVENTION

In accordance with this invention, a band clamp is provided for making a joint between tubular bodies which exhibits high pull-apart strength and also provides a good seal against fluid leakage. The band clamp includes a band extending from a first end to a second end and including a pair of spaced ribs extending at least part way between the first and second ends. A tightening mechanism is connected to the band and includes two clamp members movable toward and away from each other for tightening and loosening of the band. The band clamp further includes a gasket located on an inner surface of the band between the ribs and extending between the first and second ends. The use of the ribs with the interposed gasket provides a mechanical interlock of the band clamp with the tubular bodies being joined while providing a seal against the escape of fluid at the junction between the two bodies.

In accordance with another aspect of the invention, a clamping assembly is provided which includes the band clamp, with or without a gasket, along with a pair of adapters for connecting to the tubular bodies to provide them with suitable ribs that mate with those of the band clamp. This permits the band clamp to be retrofitted to existing tubular bodies, such as vehicle exhaust system components, that do not include any ribs or beads at their adjoining ends.

A complete understanding of this invention may be obtained from the detailed description that follows taken with the accompanying drawings.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
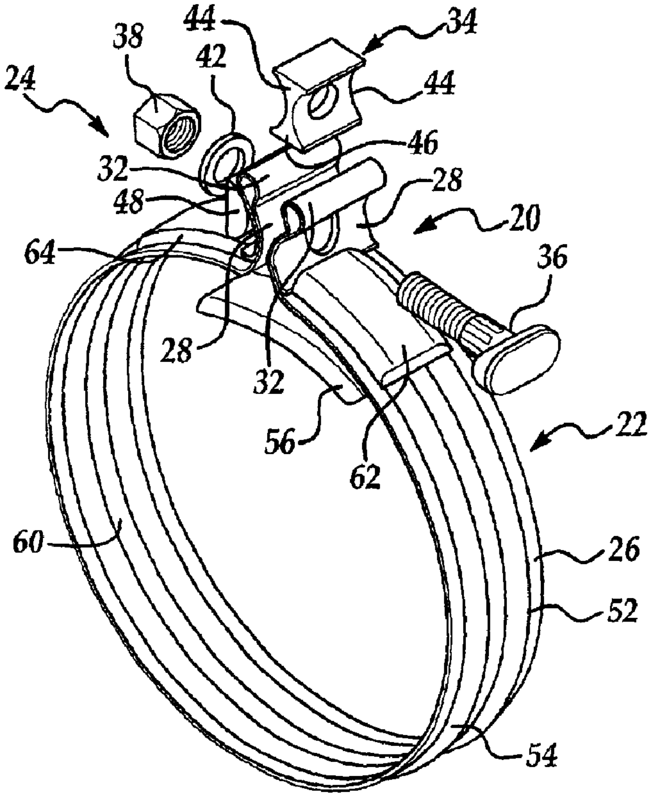
FIG. 1 is a perspective view of a first embodiment of the band clamp of this invention.
Figure 2:
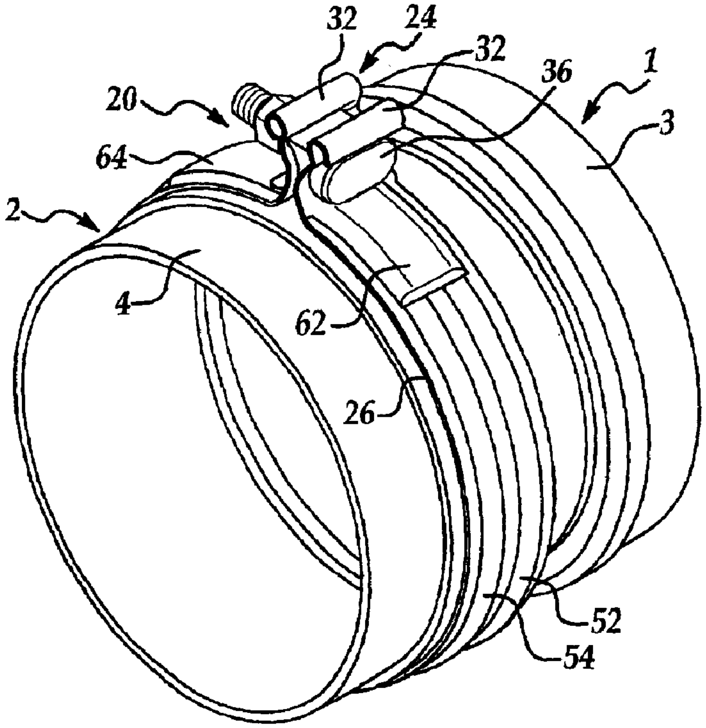
FIG. 2 is a perspective view of two tubular bodies joined by the band clamp of FIG. 1.
Figure 3:
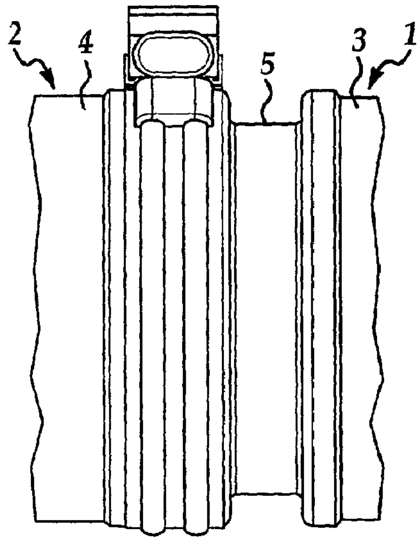
FIG. 3 is a side elevation view of the assembly as shown in FIG. 2.

Referring now to the drawings, the invention will be described in different embodiments of a band clamp especially adapted for making a joint between two tubular members. The invention will be described with reference to its use in a vehicle exhaust system. In this application, the band clamp is preferably made of stainless steel with a tightening mechanism of the type described in Cassel U.S. Pat. No. 3,905,623 granted Sep. 16, 1975, the disclosure of which is hereby incorporated by reference. Other tightening mechanisms can be used such as are disclosed in Cassel U.S. Pat. No. 4,312,526 granted Jan. 26, 1982 and Cassel U.S. Pat. No. 6,269,524 granted Aug. 7, 2001, and the complete contents of these patents are also hereby incorporated by reference. Other, more diverse tightening mechanisms can be used as well. In this regard, it will be appreciated as the description proceeds that the invention is useful in many different applications and may be implemented in many other embodiments.

Figure 4:
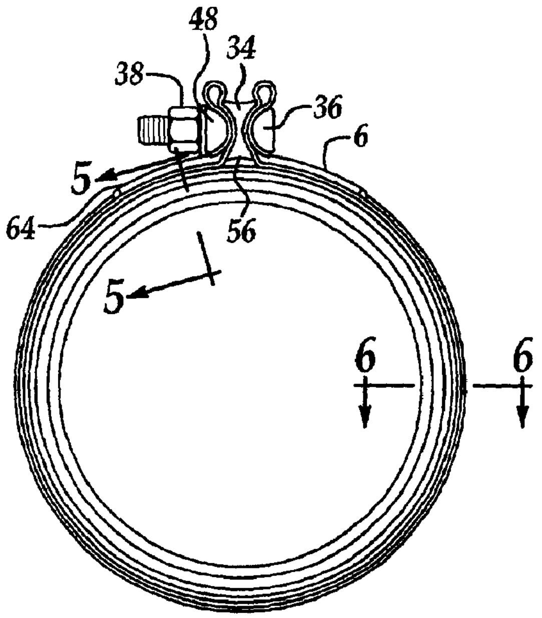
FIG. 4 is an end view of the assembly as shown in FIG. 2.
Figure 5:
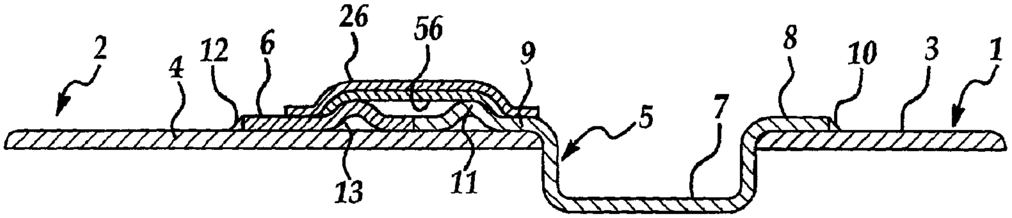
FIG. 5 is a sectional view taken on lines 5—5 of FIG. 4.

The following illustrative example is applicable to retrofitting the band clamp of this invention to a catalytic converter and particulate filter as these devices are currently manufactured by providing an adapter on each such device which will accept the band clamp of this invention. In particular and with reference to FIGS. 1–6, the band clamp assembly is used for making a joint between a catalytic converter 1 and a particulate filter 2. The converter 1 has a cylindrical casing 3 and the filter 2 has a cylindrical casing 4 which is substantially the same diameter as casing 3. Both casings 3 and 4, at their adjoining ends, are substantially the same diameter and have a plain cylindrical surface, as they are conventionally manufactured. In order to use the band clamp of this invention with these conventional casings 3 and 4, it is necessary to use an adapter member on each casing. These adapters along with the band clamp together comprise a clamping assembly that is useful in retrofit applications where the tubular bodies are not specifically manufactured to be used with the band clamp. The band clamp of this invention will coact with the adapter to make a joint between the ends of the converter and the filter which will provide high pull-apart strength and a good fluid seal against exhaust gas leakage. In order to adapt the ends of the converter 1 and filter 2 to the characteristics of the clamp, an adapter collar 5 on either the converter or filter and a mating adapter ring 6 on the other. The adapter collar 5, as best shown in FIG. 5, comprises an annular bridging member 7 which is trough-shape in cross-section with longitudinally extending edge flanges 8 and 9. The edge flange 8 encircles the end of the cylindrical housing 3 of the converter and the end flange 9 encircles the end of the cylindrical housing 4 of the filter. The end flange 8 is attached around its periphery to the cylindrical housing 3 by a weld 10. The edge flange 9 is provided with an annular rib 11 which coacts with the band clamp in a manner to be described below. The adapter ring 6 encircles the cylindrical filter casing 4 and is attached thereto by a weld 12. The ring 6 is formed with an annular rib 13 which is adapted to coact with the band clamp 20 as will be described below.

Figure 6:
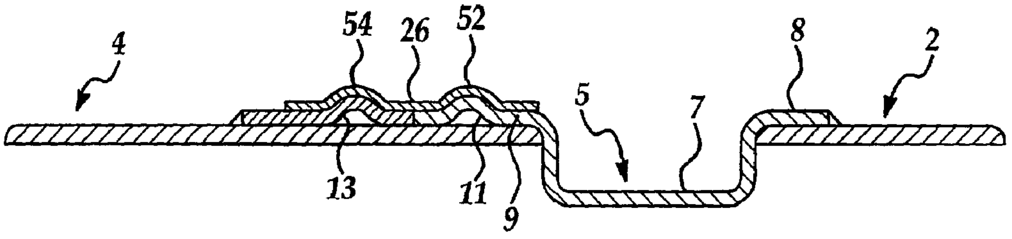
FIG. 6 is a sectional view taken on lines 6—6 of FIG. 4.

When the catalytic converter 1 and the particulate filter 2 are to be joined together, the end of the cylindrical filter casing 4 is inserted into the edge flange 9 of the adapter collar 5, with the opposed ends of the adapter ring 6 and the edge flange 9 in abutment with each other as shown in FIGS. 5 and 6. Then, the clamp band 20 is disposed around the annular ribs 11 and 13 as will be described below.

By a modification of the embodiment described above, the adapter collar 5 and the adapter ring 6 are dispensed with and the annular rib 11 is located near the end of the cylindrical casing 3 of the converter and the annular rib 13 is provided near the end of the casing 4 of the filter. This modification permits the joint to be made with fewer parts and with a closer coupling between the converter and the filter. To facilitate handling while the band clamp is applied to make a joint, the adjoining ends of the two casings may be provided with mating telescopic rings.

First Embodiment of this Invention

The first embodiment of the band clamp and clamping assembly of this invention will be described with reference to FIGS. 1–6. The band clamp 20 comprises, in general, a clamp band 22 and a clamp tightening mechanism 24. The band 22 comprises a clamp sleeve 26 that is formed as a roundish-shaped sector which defines a circumferential loop. The band 22 has first and second ends which in this embodiment are located at a pair of confronting end flanges 28 that extend radially from the band and are unitary therewith. The end flanges 28 serve as parts of the clamp tightening mechanism 24. Each end flange 28 terminates at its outer end in a retainer bight 32 which is formed by folding the end of the flange on itself to provide a double layer of sheet metal. These folded end flanges 28 comprise clamping members that, when drawn together, pull the first and second ends of the band toward each other to thereby tighten the band clamp.

The clamp tightening mechanism 24 comprises the pair of end flanges 28, a reaction member or spline 34, bolt 36, spacer bar 48, nut 38 and a washer 42. The spline 34 has opposed sidewalls 44 which are arcuate and concave in cross-section; it also has an inner surface 46 which is concave in cross-section with a curvature conforming to the member it seats against when the clamp is tightened. The head of bolt 36 is disposed adjacent one end flange 28 and has an inner surface with an arcuate cross-section corresponding to the opposed surface of the spline 34. The spacer bar 48 is disposed adjacent the other end flange and has an arcuate cross-section on its inner surface corresponding to that of the reaction member 24. The end flanges 28, spline 34 and spacer bar 48 are provided with aligned bolt holes for receiving the shank of the bolt 36 with the bolt head seated on the outside surface of one end flange 28 and with the nut 38 and washer 42 seated against the outside surface of the other end flange 28.

The clamp band 22 is made from the single piece of sheet metal, preferably stainless steel, delimited circumferentially by the end flanges 28 and axially by a pair a lateral edges that extend between the first and second ends. The band 22 is provided with structural parts including annular ribs 52 and 54, dome-shaped pockets 56 and 58, and a central portion 60 between the ribs 52 and 54. These elements, along with end flanges 28, bights 32, and bolt holes are all preferably formed by conventional metal-forming techniques with the material in a flat condition. After the above-mentioned metal-forming operations, the clamp band 22 is additionally formed into an open loop structure as best shown in FIG. 1.

The annular ribs 52 and 54 have a cross-sectional configuration which is arcuate and convex with respect to the outer surface of the sleeve 26. This cross-sectional configuration of ribs 52 and 54 conforms with that of the ribs 11 and 13 provided in the adapter collar 5 and the adapter ring 6, respectively. The ribs 52 and 54 are located inwardly of the lateral edges and are spaced from each other by a distance that permits mating of each clamping rib 52 and 54 with its respective rib 11 and 13 from one of the two adapters. The central portion 60 spans the distance between the clamping ribs 52 and 54 and overlies the junction between the adapters 5 and 6 when the band is assembled over their adjoining ends.

As shown in FIG. 6, the mating pair of ribs 52 and 11 and the mating pair of ribs 54 and 13 both provide a good gas seal by virtue of the tight engagement which can be achieved throughout circumferential length of the ribs. In order to provide a good gas seal in the vicinity of the clamp tightening mechanism 24, a tongue 56 is provided which spans the gap between the end flanges 28 and overlaps a part of the clamp sleeve 26 on both sides of the gap. The amount of overlap on each side of the gap is suitably about one-eighth of the circumference of the band clamp. The tongue 56, as shown in FIG. 5, is flat in the central region extending between the peaks of the ribs 11 and 13 and is arcuate at its free edges with a curvature corresponding to the outboard portions of the ribs so as to provide close sealing engagement therewith. As shown in FIGS. 1 and 4, the clamp sleeve 26 is provided with dome-shaped pockets 62 and 64 each of which extends circumferentially from a respective end flange 28. The pockets 62 and 64 are suitably of equal circumferential length and the length between their outer ends is sufficient to accommodate the tongue 56 within the dome-shaped pockets. The tongue 56 is suitably welded at one end to the clamp sleeve 26. The clamp sleeve has a cross-sectional configuration throughout the dome-shaped pocket 56 as shown in FIG. 5. This cross-section includes a central region spanning the width of the tongue 56 in close conformity therewith and terminating in opposite edges which are flat and in engagement with the flat portions of the respective adapter ring 6 and adapter collar 5. The dome-shape pocket 62 is of the same configuration as dome-shape pocket 64.

In use of the band clamp 20, it is applied in its loosely assembled condition around either the converter 1 or the filter 2 before these two components are brought together. When the converter and filter are positioned with the edge flange 9 abutted against the adapter ring 6, the clamp band is positioned so that the annular ribs 52 and 54 are mated with the ribs 11 and 13, respectively. Then, the band clamp 24 is tightened to a specified torque to achieve a final tightening of the clamp. In this condition, the clamp sleeve 26 is stretched around the annular ribs 11 and 13 and applies a clamp load which is sufficient to cause the mating ribs 11 and 52 and the mating ribs 13 and 54 to be in fluid tight engagement around the periphery of the ribs; further, the tongue 56 is pressed in tight sealing engagement against the ribs 11 and 13 by the clamp sleeve 26 which engages at its outer edges with the flat portions of the adapter ring 6 and the edge flange 9 to form a gas tight seal.

Figure 7:
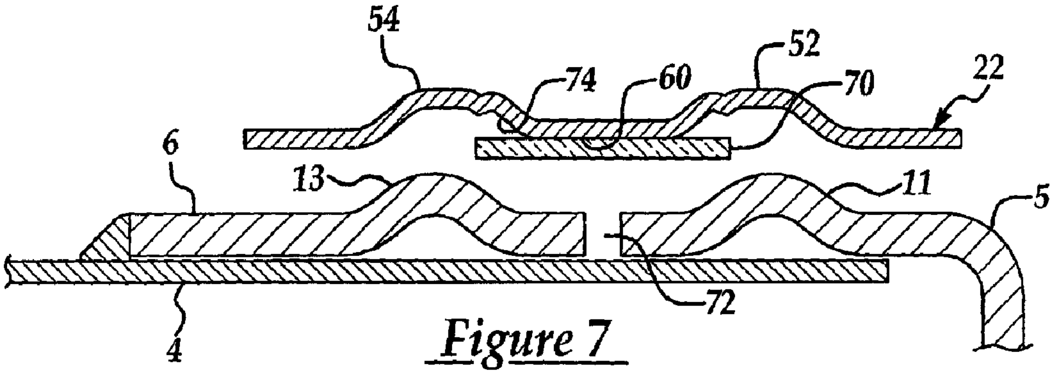
FIG. 7 is an enlarged, fragmentary sectional view as in FIG. 6 showing a preassembled condition of a modification of the first embodiment that includes a fiberglass gasket.
Figure 8:
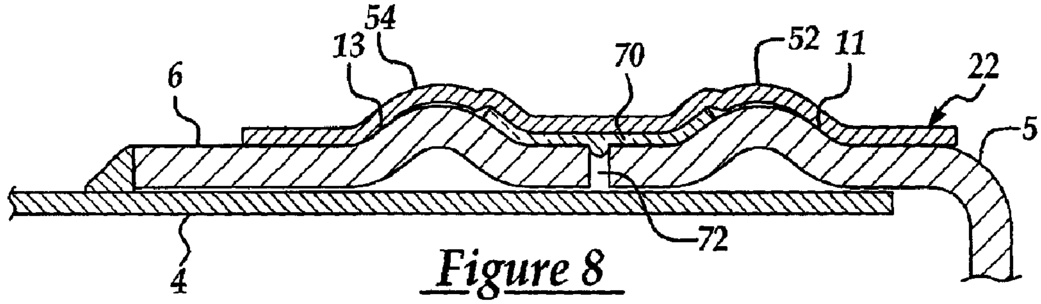
FIG. 8 is sectional view as in FIG. 7 following assembly and tightening of the band clamp with its fiberglass gasket.

Referring now to FIGS. 7 and 8, in a first modified form of the embodiment of FIGS. 1–6, a gasket 70 is provided at the central portion 60 to further improve the sealing of the adapter collar 5 and ring 6 against the escape of gas through the junction 72 formed between these components. As shown in FIG. 7, the gasket 70 is initially attached to the band 22 at its central portion 60 by an adhesive or the like, and this can be done as a part of the manufacturing of the band clamp itself. Alternatively, the gasket 70 could be provided as a separate component that is not attached to the band 22 until final assembly of the clamp over the components being joined. As shown, the gasket is provided with a sufficient width to span the junction 72 and provide a significant sealing overlap with each of the two adapters 5 and 6. For this purpose, the gasket 70 partially overlies the ribs; however, it does not entirely cover the ribs in order to provide good metal-to-metal contact of the adapter ribs 11, 13 with the clamping ribs 52, 54. To accommodate the thickness of the gasket 70 and maximize this metal-to-metal contact of the ribs, the central portion 60 of the band 22 is recessed as shown at 74, with this recess extending from an inner side edge of one rib 52 across the central portion 60 to the other rib 54.

Figure 9:
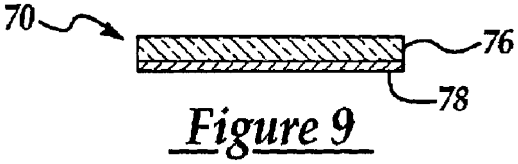
FIG. 9 is a cross-sectional view of the gasket of FIGS. 7 and 8.

Gasket 70 comprises a compressible material and any of a number of suitable homogenous or composite gasket materials can be used depending upon the temperature and mechanical durability constraints required for a particular application. For example, the gasket 70 can be a fiberglass or mica gasket. In the illustrated embodiment, a fiberglass gasket having an aluminum outer surface is used, as shown in FIG. 9. This gasket 70 includes a layer of temperature resistant silica fabric 76 rated for 980° C. that is aluminized. This aluminum surface 78 is oriented to face radially inwardly when the gasket is attached to the band 22 so that the aluminum surface 78 directly contacts the outer surfaces of the adapters 5 and 6.

Figure 10:
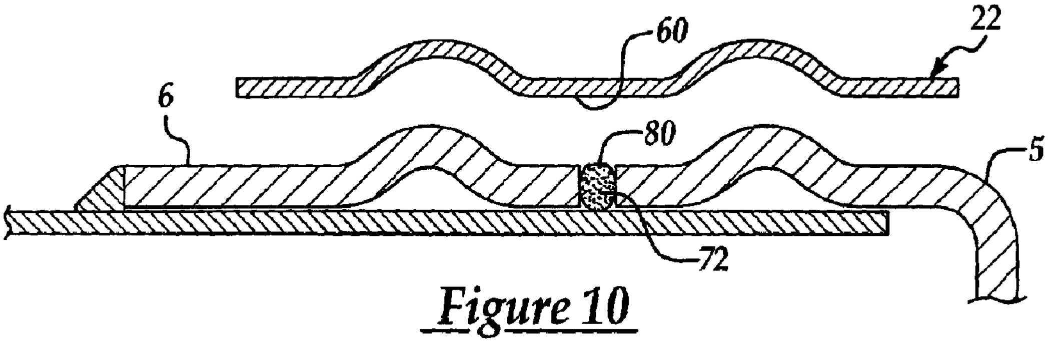
FIG. 10 is a sectional view as in FIG. 7 showing a pre-assembled condition of another modification of the first embodiment that includes a graphite gasket.
Figure 11:
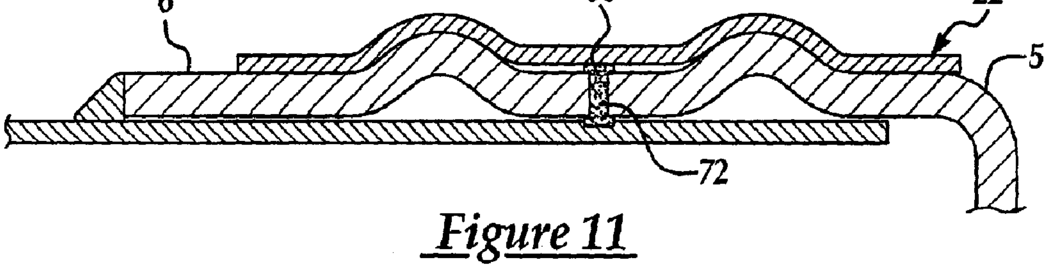
FIG. 11 is sectional view as in FIG. 8 following assembly and tightening of the band clamp with its graphite gasket.

Referring now to FIGS. 10 and 11, another modified version of the first embodiment is shown using a graphite gasket 80 in lieu of the fiberglass gasket 70 of FIGS. 7–9. This graphite gasket can be a braided Inconel™ with carbon yarn that is impregnated with graphite. Gasket 80 is initially placed within the junction 72 between the adapters 5 and 6 and is sized to be somewhat wider than the ultimate span of the junction when the band 22 is tightened over the adapters. Thus, as shown in FIG. 11, tightening of the band acts to draw the adjoining end faces of the adapters toward each other, compressing the gasket 80 axially and thereby forming a hermetic seal at the junction 72. As will be understood by those skilled in the art, fiberglass gaskets such as gasket 70 can be compressed radially, as occurs in the assembly shown in FIGS. 7 and 8, whereas graphite gaskets such as shown in FIGS. 10 and 11 work well when compressed axially.

Figure 12:
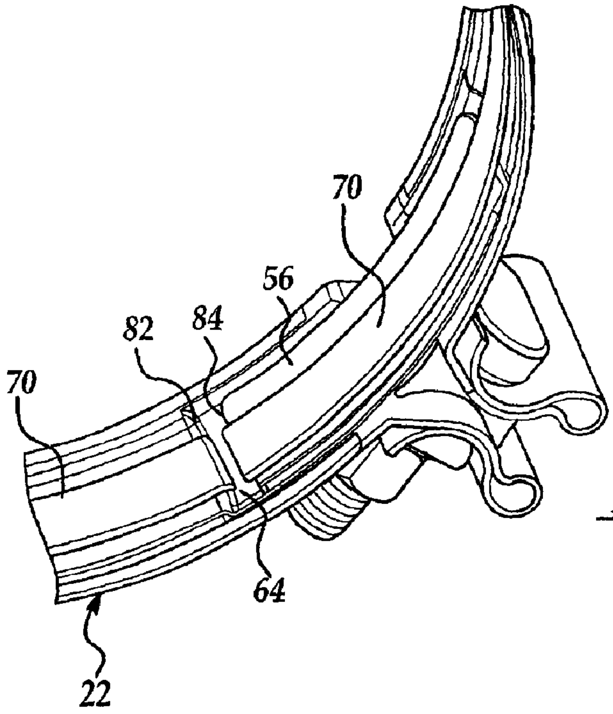
FIG. 12 is a fragmentary, perspective view of the inside pocket and tongue portion of the first embodiment showing use of the fiberglass gasket of FIGS. 7 and 8.

Another difference between gaskets 70 and 80 is that the graphite gasket comprises a closed loop that is assembled onto the assembly separately from the band 22, whereas the gasket 70 is an open loop in the form of a strip of gasket material that is discontinuous at its ends. As shown in FIG. 12, the gasket 70 extends circumferentially around the band 22 starting at an edge 82 of pocket 64 and terminating at the edge 84 of tongue 56 that is adjacent the starting edge 82. Preferably, the gasket 70 extends slightly beyond the end 84 of the tongue 56 so that the opposite ends of the gasket overlap each other when the band 22 is fully tightened.

Figure 13:
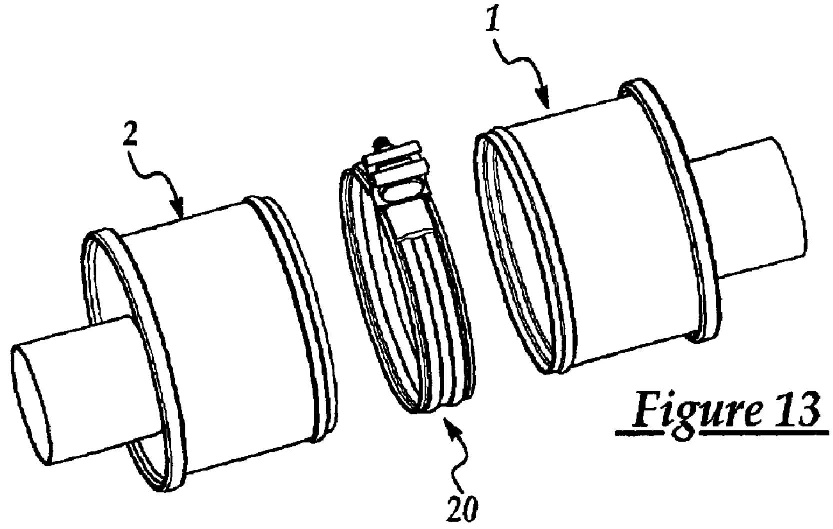
FIG. 13 is an exploded view of a pair of exhaust system components and the band clamp of FIG. 1.
Figure 14:
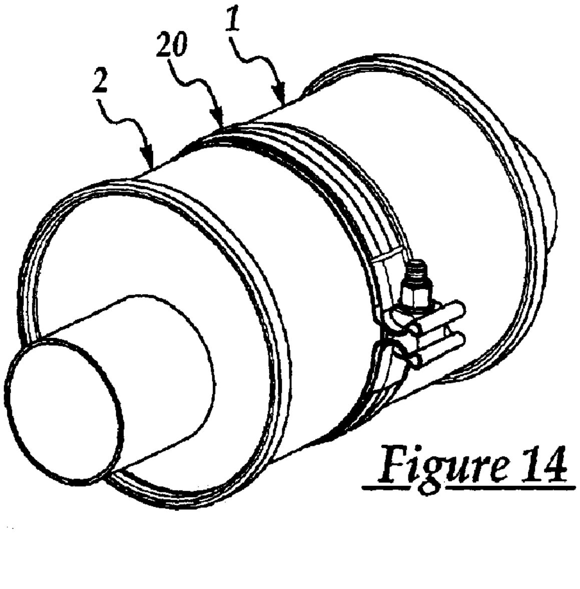
FIG. 14 is a perspective view of the assembled components of FIG. 13.

FIGS. 13 and 14 depict pre-assembled and assembled views of a pair of exhaust system components, such as a catalytic converter 1 and particulate filter 2 each having a rib formed as a unitary portion of the canister housings, thereby obviating the need for the adapters 5 and 6. Although this and the other embodiments shown depict the use of circular components, it will be appreciated that the band clamp and clamping assembly of this invention can be used with components having other cross-sectional shapes.

Second Embodiment of this Invention

Figure 15:
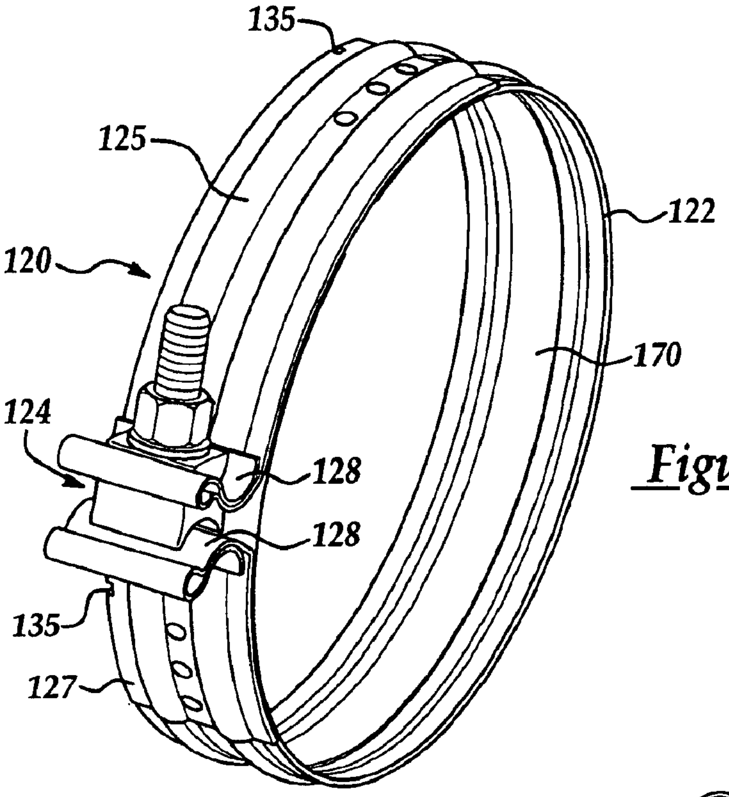
FIG. 15 is a perspective view of a second embodiment of the band clamp of this invention.
Figure 16:
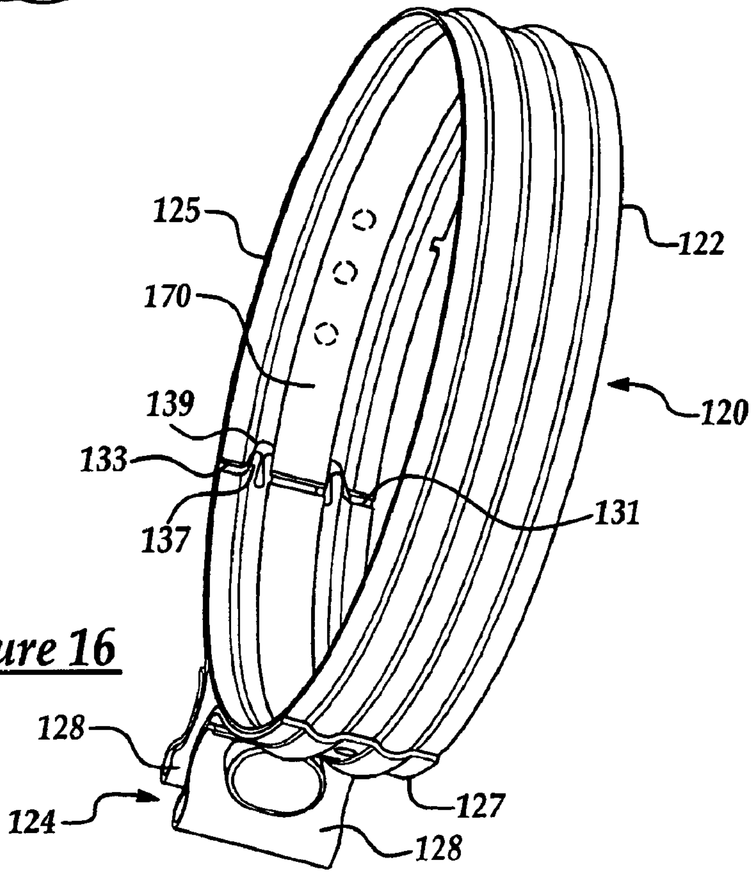
FIG. 16 is a reverse perspective view of the band clamp of FIG. 15 showing the closing of the band and gasket during tightening of the clamp.
Figure 17:
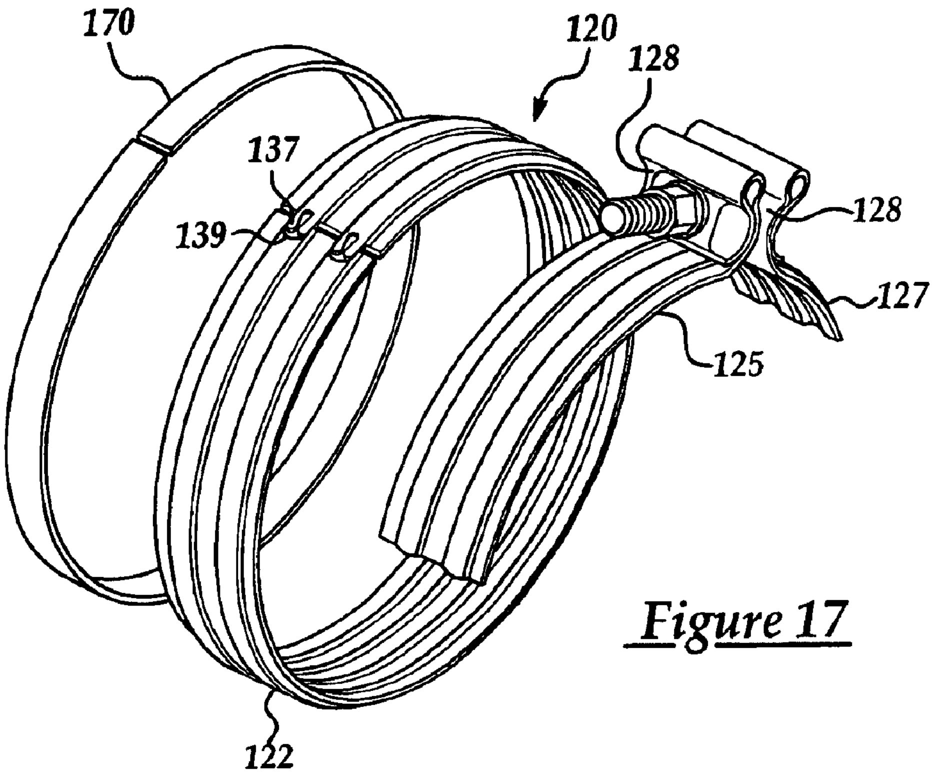
FIG. 17 is an exploded view of the gasket, band, and strap portions of the band clamp of FIG. 15.

Turning now to FIGS. 15–17, a second embodiment of a band clamp of this invention is shown which can be used in conjunction with the adapters 5 and 6 shown in FIGS. 1–6 or with components having unitary ribs, such as shown in FIGS. 13–14. Elements of this embodiment that correspond functionally to similar elements of the first embodiment are identified with numerals offset by 100 from those used in the first embodiment. Some of these components can be constructed identically to the corresponding components from the first embodiment such as, for example, the tightening mechanism.

Thus, band clamp 120 of FIGS. 15–17 include a band 122 and tightening mechanism 124. Whereas the clamp members 28 of the first embodiment are unitary extensions of the band 22 itself, the clamp members 128 of this second embodiment are formed as confronting portions of a pair of strap sections 125 and 127 that are attached to band 122 by three spot welds each. This enables band 122 to form a single open loop extending from a first end 131 to a second end 133 with these ends being aligned with each other and spaced by a gap that can be closed when the band is fully tightened. In this way, the pocket and tongue construction of the first embodiment is eliminated and replaced by a substantially continuous sealing surface extending circumferentially all the way around the band 122. The aligned ends 131 and 133 of band 122 are located at a different angular position about the circumference of the band than the tightening mechanism 124, so that the strap section 125 therefore overlies the gap. For this purpose, the strap section 125 is approximately twice as long as strap section 127. Both strap sections span the entire width of band 122 to add mechanical strength to the overall band clamp.

The band clamp 120 is designed to have a total circumferential distance about its inner surface that is specific to the particular application for which it is used so that it can be filly tightened when in use and will provide a desired amount of clamping force when fully tightened. To accurately maintain this specific distance when attaching the strap sections 125 and 127 to the band 122, alignment notches 135 are provided in both the band 122 and each of the strap sections so that proper registration of the strap sections with the band can be maintained during welding.

As best seen in FIG. 16, the first and second ends 131 and 133 of the band are separated by a gap that is adjustable by tightening and loosening of the clamping mechanism 124. These first and second ends include complementary mating portions 137 and 139 that come into engagement during tightening of the band 122. In the embodiment shown, these mating portions include two sets of spring members 137 in the first end 131 and two grooves 139 in the second end 133. During tightening of the band clamp 120, each pair of spring members engage opposing edges of their associated groove and are squeezed towards each other to thereby form an interference fit with the groove. In this way, the band 122 provides a substantially continuous sealing surface about its circumference. The construction and use of the spring members and grooves are more fully disclosed in U.S. patent application Ser. No. U.S. 2002/0014772 A1, the entire contents of which are hereby incorporated by reference. The spring members and grooves can be located at the two ribs; that is, axially aligned with the ribs.

The band clamp 120 includes a fiberglass gasket 170 as in FIGS. 7–9, although depending upon the particular application, a graphite or other gasket, or even no gasket may be used. Gasket 170 extends from the first end 131 of the band 122 to its second end and is discontinuous at these ends. As with the first embodiment shown in FIG. 12, the gasket can extend slightly beyond one or both of the ends 131 and 133 so that opposite ends of the gasket overlie each other when the band clamp is fully tightened.

Third Embodiment of this Invention

Figure 18:
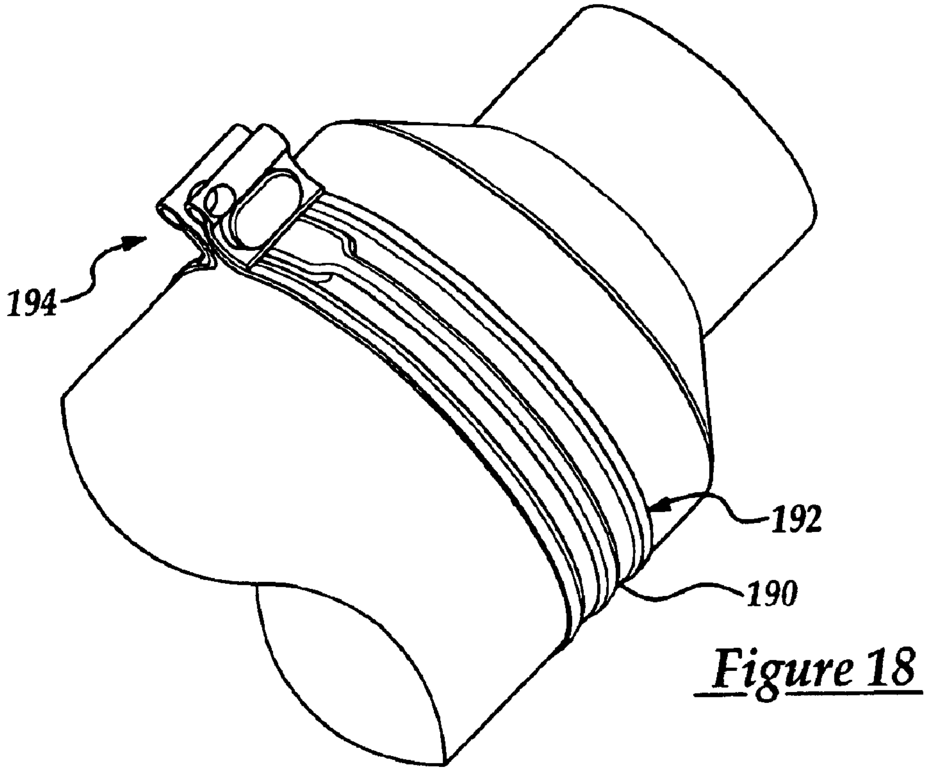
FIG. 18 is a perspective view of a third embodiment of the band clamp of this invention wherein the band clamp includes inverted (concave) ribs.
Figure 19:
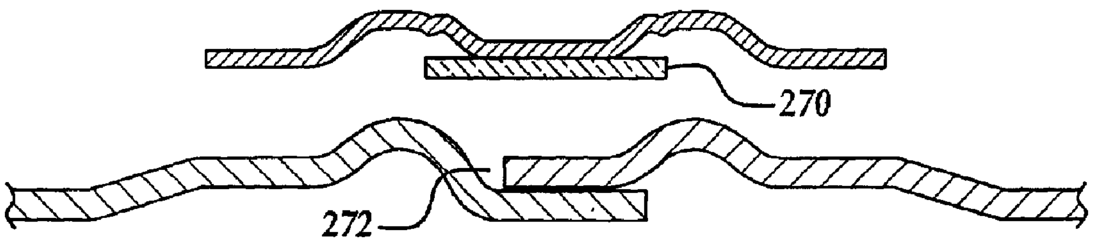
FIG. 19 is a fragmentary sectional view of either of the first two embodiments of the band clamp in a pre-assembled condition as it could be used with a fiberglass gasket for a lap joint between tubular bodies.
Figure 20:
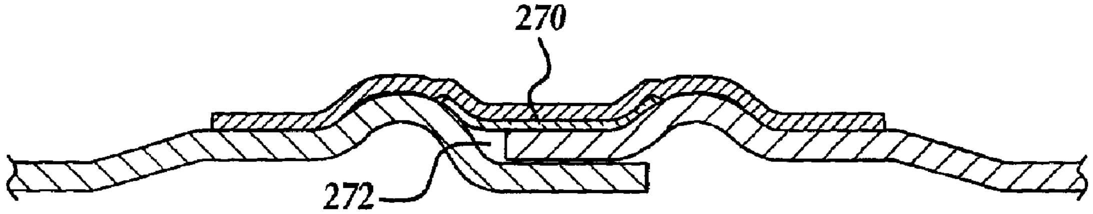
FIG. 20 is a view as in FIG. 19 following assembly and tightening of the band clamp.
Figure 21:
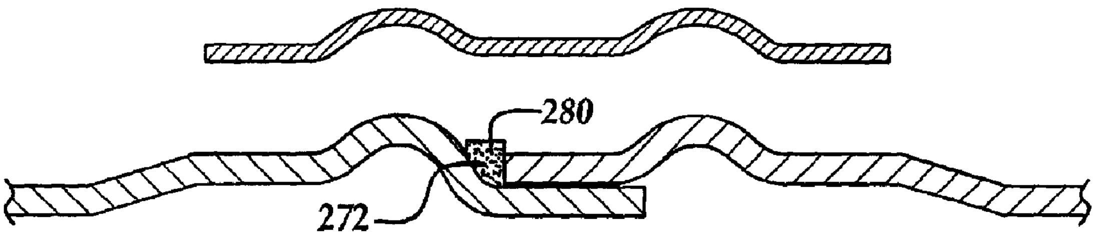
FIG. 21 is a fragmentary sectional view of either of the first two embodiments of the band clamp in a pre-assembled condition as it could be used with a graphite gasket for a lap joint between tubular bodies.
Figure 22:
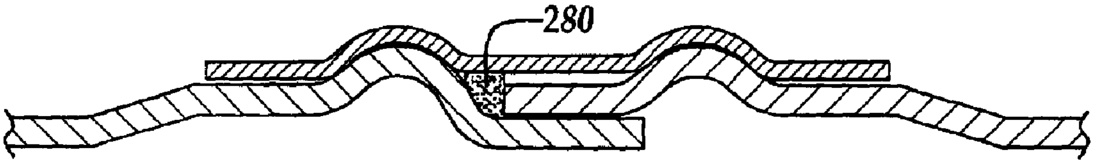
FIG. 22 is a view as in FIG. 21 following assembly and tightening of the band clamp.

The third embodiment of this invention can be implemented the same as in the first or second embodiments except for the structure of the annular ribs. In the third embodiment shown in FIG. 18, the ribs 190 on the band 192 of the band clamp 194 are concave in cross-section with reference to the outer surface of the clamp sleeve instead of being convex as in the first two embodiments. Likewise, the annular ribs on the components being joined (such as the catalytic converter and particulate filter) are concave with respect to the outer surface. Otherwise the structure of the clamp band is the same as that of the first two embodiments of this invention.

The first three embodiments discussed above have involved the joining of tubular bodies or adapters having abutting ends. As shown in FIGS. 19–22, the band clamp of this invention can be used for lap joints as well. As in the first embodiments, it will be noted that, where a gasket 270 or 280 is used, it is located at the junction 272 between the bodies to thereby provide a hermetic seal.

Fourth Embodiment of this Invention

Figure 23:
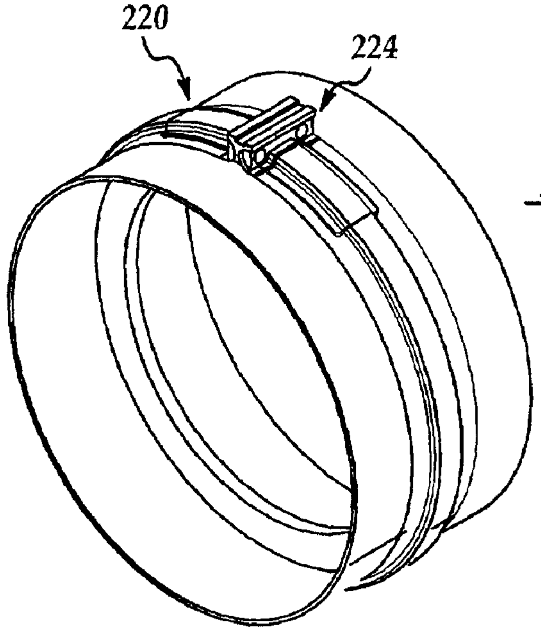
FIG. 23 is a perspective view of a fourth embodiment of the band clamp of this invention.
Figure 24:
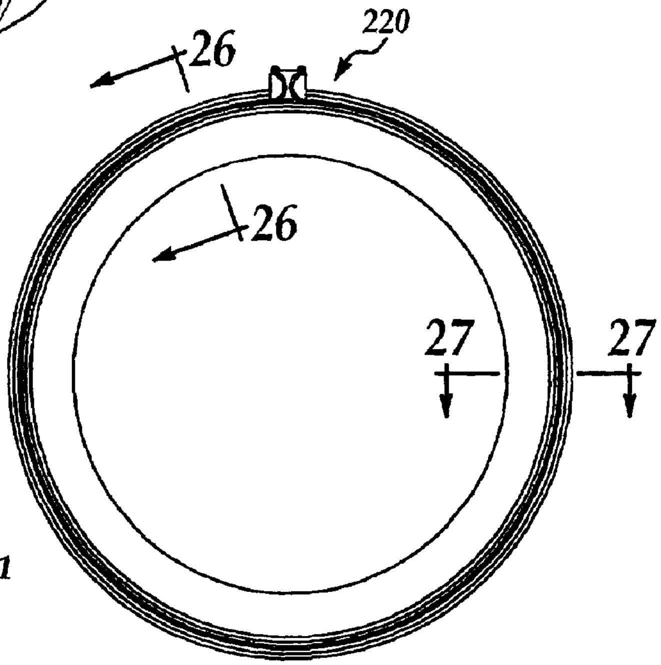
FIG. 24 is a side elevation view of the band clamp of FIG. 23.
Figure 25:
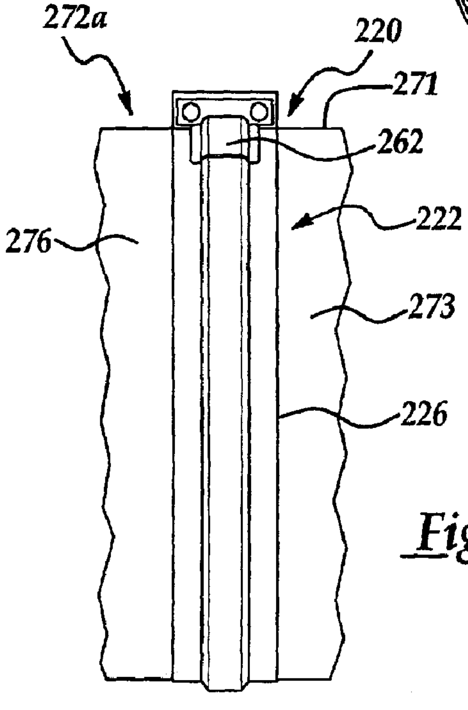
FIG. 25 is an end view of the band clamp of FIG. 24.
Figure 26:
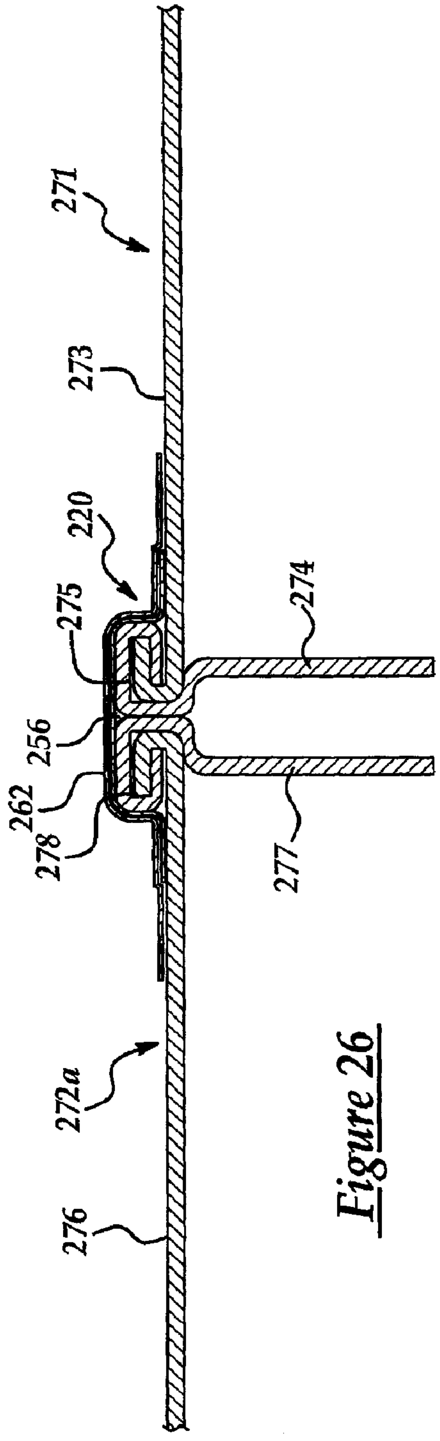
FIG. 26 is a sectional view taken on lines 10—10 of FIG. 25.
Figure 27:
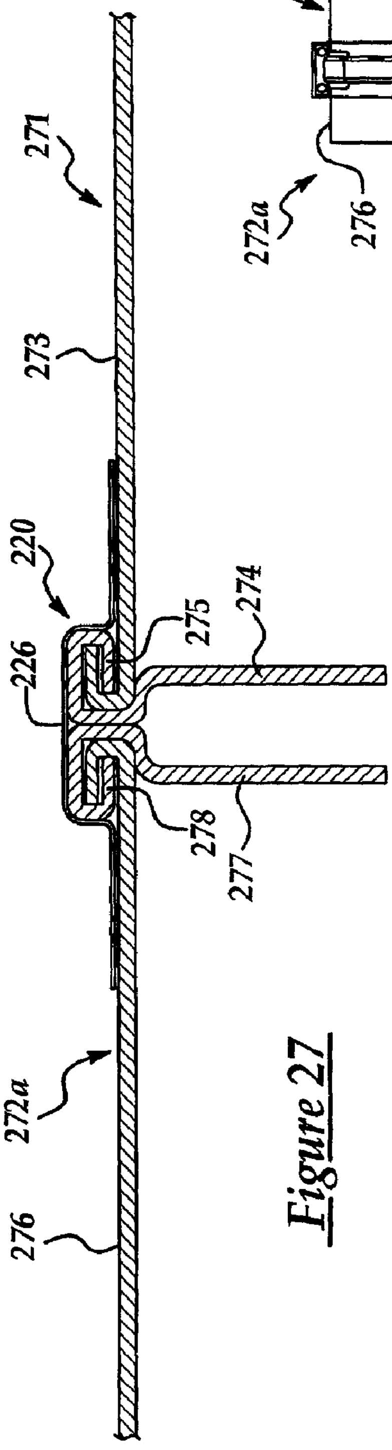
FIG. 27 is a sectional view taken on lines 11—11 of FIG. 25.
Figure 28:
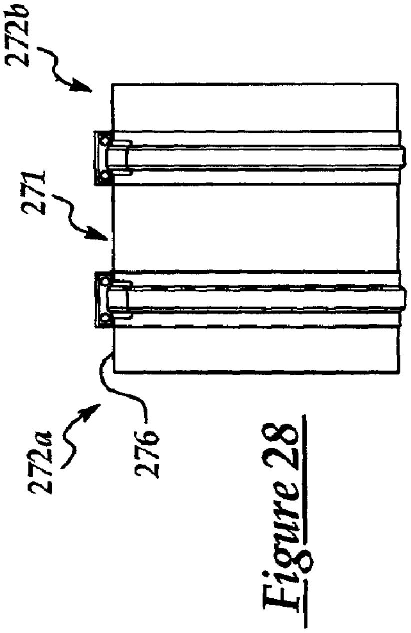
FIG. 28 is a side elevation view which shows two band clamps of this invention each of which makes a separate joint between opposite ends of one device and the ends of two adjoining devices.

The fourth embodiment of this invention will be described with reference to FIGS. 23–28. This embodiment is especially adapted for making a joint between the ends of two devices which are of substantially the same diameters with the end of each device being provided with an annular bead. As shown in FIGS. 23 and 27, the band clamp 220 is used to form a fluid tight joint between one end of a filter 271 and an end of a muffler section 272*a* or 272*b*. As shown in FIG. 28, the filter 271 is inserted between the two sections 272*a* and 272*b* of the muffler.

As shown in FIGS. 24–27, the filter 271 is provided with a cylindrical casing 273 and a circular end panel 274. The casing 273 and panel 274 are joined by a mechanical interlock which forms a peripheral bead 275. The other end of the filter 271 has the same construction. The muffler section 272*a* comprises a cylindrical casing 276 and an end panel 277 which are joined in an annular bead 278.

The band clamp 220 is of the same construction as the band clamp 20 described above except for the cross-sectional configuration of the clamp sleeve 226. The other parts of the band clamp 220 are shown in the drawings with the same reference numerals as used in FIGS. 1–6 except for being offset by 200. In these FIGS., the clamp tightening mechanism 224 includes a pair of bolts and associated hardware (not shown) instead of a single bolt as in the first embodiment.

The clamp sleeve 226 has a U-shaped cross-section with a configuration that matches the composite configuration of beads 275 and 278 as shown. The tongue 256, as shown in FIG. 26, has a cross-sectional configuration which conforms to the composite configuration of beads 275 and 278 and the dome-shaped pockets 262 and 264 have cross-sectional configuration conforming to that of the tongue 256.

In use, the band clamp 220 is applied in a manner similar to that described above for the first embodiment. When the tightening mechanism 224 is tightened to the specified torque, the clamp provides a gas tight seal and a strong mechanical connection as described with reference to the first embodiment. A gasket such as gasket 70 can be used, if desired or necessary for a particular application.

It will thus be apparent that there has been provided in accordance with the present invention a band clamp and clamping assembly which achieves the aims and advantages specified herein. It will of course be understood that the foregoing description is of preferred exemplary embodiments of the invention and that the invention is not limited to the specific embodiments shown. Various changes and, modifications will become apparent to those skilled in the art and all such variations and modifications are intended to come within the scope of the appended claims.

What is claimed is:

1. A band clamp for connecting two tubular bodies, comprising:

a band extending from a first end to a second end and including a pair of spaced ribs extending at least part way between said first and second ends;

a tightening mechanism connected to said band and including two clamp members movable toward and away from each other to draw said first and second ends toward and away from each other for tightening and loosening of said band; and a gasket located on an inner surface of said band between said ribs and extending alone the length at said band between said first and second ends such that said gasket forms a complete loop when said first and second ends are brought together using said tightening mechanism, whereby said band clamp can be disposed over and tightened around abutting ends of the tubular bodies with said gasket inhibiting the escape of fluid through the function formed between the abutting ends of the two tubular bodies;

wherein said clamp members comprise confronting portions of a pair of strap sections and wherein each of said strap sections is secured to an outer surface of said band near a different one of said first and second ends, said band being continuous between said first and second ends with said ends being aligned with each other and spaced by a gap having a length that can be varied by tightening or loosening said band using said tightening mechanism.

2. A band clamp as defined in claim 1, wherein said first and second ends include complementary mating portions that come into engagement during tightening of said band.

3. A band clamp as defined in claim 2, wherein said first end includes at least one set of spring members and said second end includes at least one groove aligned with said spring members, wherein said spring members engage opposing edges of said groove and form an interference fit with said groove when said band is tightened using said tightening mechanism.

4. A band clamp as defined in claim 1, wherein one of said strap portions traverses said gap such that said gap is located at a different angular position about the circumference of said band than said clamping members.

5. A band clamp as defined in claim 1, wherein said gasket comprises a strip of compressible material that extends from said first end to said second end and that terminates at said ends.

6. A band clamp as defined in claim 1, wherein said gasket extends beyond at least one of said ends such that opposite ends of said gasket overlap when said band is tightened.

7. A band clamp for connecting adjacent ends of a pair of axially-aligned tubular bodies, wherein each of the tubular bodies have an integrally formed, substantially non-compressible radially-protruding rib extending circumferentially around the tubular body at its end, and wherein the adjacent ends of the tubular bodies define a junction between an end face of one of the tubular bodies and an end face or other surface portion of the other tubular body, with the ribs being offset axially from each other on each side of the junction, said band clamp comprising:

a band extending from a first end to a second end and defining a circumferential loop that can be tightened over the adjacent ends of the axially-aligned tubular bodies, said band having a pair of lateral edges extending between said first and second ends and including a pair of clamping ribs extending circumferentially along at least a portion of said loop between said first and second ends, said clamping ribs being located inwardly of said lateral edges and spaced from each other by a distance that permits mating of each clamping rib with a corresponding rib from one of the two tubular bodies when the band is assembled over the adjacent ends of the tubular bodies, said band including a central portion spanning the distance between said clamping ribs and overlying the junction between the tubular bodies when the band is assembled over the adjacent ends;

a tightening mechanism connected to said band and including two clamp members movable toward and away from each other for drawing said first and second ends toward and away from each other to thereby permit tightening and loosening of said band about the adjacent ends of the tubular bodies; and a gasket located at said central portion of said band and extending along the length of said band between said first and second ends, said gasket being compressible during tightening of said band over the tubular bodies to provide a seal at the junction of the tubular bodies for preventing fluids from escaping out of the tubular bodies through the junction.

8. A band clamp as defined in claim 7, wherein said clamp members comprise confronting portions of a pair of strap sections and wherein each of said strap sections is secured to an outer surface of said band near a different one of said first and second ends, said band being continuous between said first and second ends with said ends being aligned with each other and spaced by a gap having a length that can be varied by tightening or loosening said band using said tightening mechanism.

9. A band clamp as defined in claim 8, wherein said first and second ends include complementary mating portions that come into engagement during tightening of said band.

10. A band clamp as defined in claim 9, wherein said first end includes at least one set of spring members and said second end includes at least one groove aligned with said spring members, wherein said spring members engage opposing edges of said groove and form an interference fit with said groove when said band is tightened using said tightening mechanism.

11. A band clamp as defined in claim 8, wherein one of said strap portions traverses said gap such that said gap is located at a different angular position about the circumference of said band than said clamping members.

12. A band clamp as defined in claim 8, wherein said gasket comprises a strip of compressible material that extends from said hut end to said second end and that terminates at said ends.

13. A band clamp as defined in claims 8, wherein said gasket extends beyond at least one of said ends such that opposite ends of said gasket overlap when said band is tightened.

14. A band clamp as defined in claim 7, wherein said gasket comprises a fiberglass gasket.

15. A band clamp as defined in claim 14, wherein said fiberglass gasket includes an aluminum inner surface facing radially inwardly.

16. A band clamp as defined in claim 7, wherein said gasket is attached over a central portion of said band and partially overlies each of said ribs.

17. A band clamp as defined in claim 7, wherein said gasket comprises a graphite gasket.

18. A band clamp as defined in claim 7, wherein said gasket comprises a mica gasket.

19. A band clamp as defined in claim 7, wherein said clamp members are each located at one of said first and second ends and comprise unitary portions of said band, said band including a pocket located at each of said first and second ends, and wherein said band clamp further comprises a tongue secured to said band within the pocket located at said first end, said tongue extending beyond said first end and into the pocket located at said second end, wherein said tongue provides a seating surface for said gasket at said first and second ends, with said seating surface being substantially continuous with said central portion of said band.

20. A band clamp as defined in claim 19, wherein each rib extends circumferentially along said band from one of said pockets to the other of said pockets.

21. A band clamp as defined in claim 20, wherein said pockets each have a depth that is greater than the depth of said clamping ribs.

22. A band clamp as defined in claim 19, wherein said gasket comprises a strip of compressible material that extends from an edge of one of said pockets to an edge of said tongue that is located adjacent said edge of said one pocket.

23. A band clamp as defined in claim 19, wherein said gasket extends beyond said tongue such that opposite ends of said strip overlap when said band is tightened.

24. A clamping assembly for connecting first and second tubular bodies, comprising:

- a first adapter having a first edge flange at one axial end and a second edge flange at a second axial end, said first edge flange being adapted to be secured to an outer surface of the first tubular body and said second edge flange being adapted to be positioned over an outer surface of the second tubular body, said first adapter including a first circumferential rib located at said second edge flange;
- a second adapter having a second circumferential rib and being capable of being secured to an outer surface of the second tubular body such that said second circumferential rib is adjacent said first circumferential rib of said first adapter with said ribs overlying the second tubular body; and
- a band clamp comprising:
  - a band extending from a first end to a second end and including a pair of spaced clamping ribs extending at least part way between said first mid second ends, said clamping ribs being spaced from each other by a distance that permits mating of each clamping rib with a corresponding rib from one of the two adapters when the band is assembled over adjacent axial ends of the two adapters, and
  - a tightening mechanism connected with said band and including two clamp members movable toward and away from each other to draw said first and second ends toward and away from each other for tightening and loosening of said band.

25. A clamping assembly as defined in claim 24, further comprising a gasket located on an inner surface of said band between said ribs and extending between said first and second ends.

26. A clamping assembly as defined in claim 25, wherein said adjacent axial ends define a junction therebetween and wherein, upon tightening of said band, said gasket seals said junction thereby preventing fluid from escaping through said junction.

27. A clamping assembly defined in claim 24, wherein said first adapter comprises a collar having a different axial cross-sectional shape than said second adapter.

28. A band clamp for connecting two tubular bodies, comprising:

- a band extending from a first end to a second end and including a pair of spaced ribs extending at least part way between said first and second ends;
- a tightening mechanism connected to said band and including two clamp members movable toward and away from each other to draw said first and second ends toward and away from each other for tightening and loosening of said band; and
- a gasket located on an inner surface of said band between said ribs and extending between said first and second ends;
- wherein maid clamp members comprise confronting portions of a pair of strap sections and wherein each of said strap sections is secured to an outer surface of said band near a different one of said first and second ends, said band being continuous between said first and second ends with said ends being aligned with each other and spaced by a gap having a length that can be varied by tightening or loosening said band using said tightening mechanism;
- wherein said first and second ends include complementary mating portions that come into engagement during tightening of said band; and
- wherein said mating portions are axially aligned with said ribs.

29. A band clamp for connecting two tubular bodies, comprising:

- a band extending from a first end to a second end and including a pair of spaced ribs extending at least part way between said first and second ends;
- a tightening mechanism connected to said band and including two clamp members movable toward and away from each other to draw said first and second ends toward and away from each other for tightening and loosening of said band; and a gasket located on an inner surface of said band between said ribs and extending alone the length of said band between said first and second ends such that said gasket forms a complete loop when said first and second ends are brought together using said tightening mechanism, whereby said band clamp can be disposed over and tightened around abutting ends of the tubular bodies with said gasket inhibiting the escape of fluid through the function formed between the abutting ends of the two tubular bodies;

wherein said gasket is made of fiberglass and includes an aluminum inner surface facing radially inwardly.

30. A band clamp for connecting adjacent ends of a pair of axially-aligned tubular bodies, wherein each of the tubular bodies have a radially-protruding rib extending circumferentially around the tubular body at its end, and wherein the adjacent ends of the tubular bodies define a junction between an end face of one of the tubular bodies and an end face or other surface portion of the other tubular body, with the ribs being offset axially from each other on each side of the junction, said band clamp comprising:

a band extending from a first end to a second end and defining a circumferential loop that can be tightened over the adjacent ends of the axially-aligned tubular bodies, said band having a pair of lateral edges extending between said first and second ends and including a pair of clumping ribs extending circumferentially along at least a portion of said loop between said first and second ends, said clamping ribs being located inwardly of said lateral edges and spaced from each other by a distance that permits mating of each clamping rib with a corresponding rib from one of the two tubular bodies when the band is assembled over the adjacent ends of the tubular bodies, said band including a central portion spanning the distance between said clamping ribs and overlying the junction between the tubular bodies when the band is assembled over the adjacent ends;

a tightening mechanism connected to said band and including two clamp members movable toward and away from each other for drawing said first and second ends toward and away from each other to thereby permit tightening and loosening of said band inborn the adjacent ends of the tubular bodies;

a gasket located at said central portion of said band, said gasket being compressible during tightening of said band over the tubular bodies to provide a seal at the junction of the tubular bodies for preventing fluids from escaping out of the tubular bodies through the junction;

wherein said clamp members comprise confronting portions of a pair of strap sections and wherein each of said strap sections is secured to an outer surface of said band near a different one of said first and second ends, said band being continuous between said first and second ends with said ends being aligned with each other and spaced by a gap having a length that can be varied by tightening or loosening said band using said tightening mechanism;

wherein said first and second ends include complementary mating portions that come into engagement during tightening of said band, and wherein said mating portions are axially aligned with said clamping ribs.

* * * * *